(12) United States Patent
Fässler et al.

(10) Patent No.: US 6,524,178 B1
(45) Date of Patent: Feb. 25, 2003

(54) DOUBLE CLIPPING APPARATUS AND METHOD FOR FORMING CLIPPED SAUSAGES

(75) Inventors: Markus Fässler, Arnegg (CH); Michael Brunschwiler, Gossau (CH)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/697,841

(22) Filed: Oct. 27, 2000

(30) Foreign Application Priority Data

Oct. 29, 1999 (CH) ................................ 1978/99

(51) Int. Cl.$^7$ ................................................ A22C 11/02
(52) U.S. Cl. ......................................................... 452/37
(58) Field of Search .............................. 452/37, 31, 30

(56) References Cited

U.S. PATENT DOCUMENTS

| | | | | |
|---|---|---|---|---|
| 4,017,941 A | * | 4/1977 | Raudys et al. | 138/118.1 |
| 4,044,425 A | * | 8/1977 | Nausedas | 452/45 |
| 4,980,949 A | * | 1/1991 | Stanley | 452/32 |
| 5,167,567 A | | 12/1992 | Evans | |
| 5,743,792 A | | 4/1998 | Hanten et al. | |

FOREIGN PATENT DOCUMENTS

| | | |
|---|---|---|
| DE | 14 11 489 A | 4/1969 |
| DE | 36 08 983 A | 10/1987 |
| DE | 196 44 074 A | 5/1998 |
| EP | 0 000 821 A | 2/1979 |
| EP | 0 744 130 A | 11/1996 |
| FR | 2 287 176 A | 5/1976 |
| GB | 2 109 219 A | 6/1973 |

\* cited by examiner

Primary Examiner—Charles T. Jordan
Assistant Examiner—Judith A. Nelson
(74) Attorney, Agent, or Firm—Banner & Witcoff, Ltd.

(57) ABSTRACT

The present invention concerns a double clipping apparatus for closing filled casings with clips (4a, 4b), on which the clipping-distance (X) can be adjusted without an exchange of components. This increases the flexibility of the double clipping apparatus with respect to changing production situations, which leads to an ease of work and to cost reductions. A further advantage is, that, through a change of the clip-distance (X), an influence on the positioning of the labels (13), which are printed in fixed distances on the casing, on the ready products can be exerted, whereby under involvement of a sensor (12) with an analyzing and control electronics a double clipping apparatus with automatic label positioning variable adjuster can be realized.

31 Claims, 4 Drawing Sheets

DOUBLE CLIPPING APPARATUS AND METHOD FOR FORMING CLIPPED SAUSAGES

CROSS REFERENCE TO RELATED APPLICATIONS

This application claims the priority of the Swiss patent application No. 1978/99, filed on Oct. $29^{th}$, 1999, the disclosure of which is incorporated herein by reference in its entirely.

BACKGROUND OF THE INVENTION

The present invention relates to double clipping apparatuses according to the preambles of the claims 1, 20 and 21 and to a method for forming clipped sausages according to the preamble of claim 26.

Double clipping apparatuses are used in butcher's shops for the production of sausages from filled artificial or natural casings. For doing so, at one position of the filled casing that later is located between two sausages, the casing is gathered and then the constriction obtained is voided. After that the gathered and voided section is pinched off by installing two metal clips with a distance between them and is, where appropriate, cut between the clips, whereby the ends of the sausages are formed. Depending on the type of sausage, the size and the casing used for the sausages, the desired distance between the clips may be different. Such apparatus are also used for closing other tubular packagings.

There are known double clipping apparatus which clip distance can be adjusted to the particular product by converting the apparatus. This conversion, however, is time-consuming, which means a corresponding production loss, and necessitates additional components, wherefore often a single, however for many products too large clip distance is used, causing in consequence that an unnecessary amount of casing material is consumed.

BRIEF SUMMARY OF THE INVENTION

Hence, it is a general object of the invention to provide double clipping apparatuses and a method which do not have the before mentioned disadvantages.

Now, in order to implement these and still further objects of the invention, which will become more readily apparent as the description proceeds, the double clipping apparatus for forming sausages from a filled sausage type packaging or a filled casing by forming gathered and voided sections and installing in each of said sections at a time two clips at a distance from each other, is manifested by the features that it comprises a variable adjuster defining said distance.

Another aspect of the invention is a double clipping apparatus for forming sausages from filled tubular packagings or filled casings by forming gathered and voided sections and installing in each of said sections at a time two clips at a distance from each other, wherein said distance is manually or automatically, e.g. in dependence on one or several production-parameters, adjustable during operation of said apparatus.

A further aspect of the invention is a double clipping apparatus, for forming sausages with clipped ends from a filled casing by gathering and voiding sections of said casing and installing in each of said sections at a time two clips at a distance from each other that each form the end of a different sausage, wherein said distance is adjustable, without an exchange of components, by means of a variable adjuster defining said distance.

While sausage type packagings resp. tubular packagings are used to form sausages from all type of pasty or liquid materials (food and non-food), artificial or natural casings are used to form sausages from minced or otherwise processed meat.

All of the double clipping apparatuses as per the invention are designed in such a way, that the distance between the clips is adjustable without an exchange of components and the variable adjuster mentioned before is a component of the double clipping apparatus that can be adjusted without being taken away from the double clipping apparatus. This way, the clip-distance can be adjusted quickly and cost-effective, resp. can be adapted to the respectively produced product (sausage type and sausage size) and specific operating modes become possible, which have not been executable with the previous apparatuses.

Preferably, the clip distance is adjusted through a movement of at least one of the clip-channels relative to the other clip-channel, e.g. through a displacement motion for which preferably a controllable or a closed loop controllable movement means is provided, like e.g. a pneumatic actuating means, a hydraulic cylinder assembly, a spindle drive or a linear motor assembly.

Preferably, the clip-distance is adjustable during operation. This results in the advantage, that it can be used as a control-parameter for further production parameters.

In a preferred embodiment of the invention the clip-distance can be adjusted in stepless manner, in another embodiment it can be adjusted in steps.

Preferably, the adjustment of the clip-distance can be done manually. It is also of advantage, if it is automatically adjustable in dependence on one or several production parameters. By this, there is the possibility to let the clip-distance automatically be adjusted through a production control system, which results in a considerable ease when having a flexible production with a multitude of different products.

A preferred embodiment comprises actuating cylinders for the adjustment of the clip-distance in steps, preferably pneumatic cylinders.

Beside a product-specific adjustment of the clip-distance, it can moreover be desired to use it as a variable correction parameter in the running production process, for example for the label positioning in a production with packaging that carries customer labels, in particular sausages. The packaging resp. casings used in this case are printed in fixed distances with labels, which most times include the type of sausage and/or the company logo. The distances between the labels normally correspond with the theoretical length of the sausage. In order to achieve a uniform appearance of the sausages and to have the full information of the labels available on each sausage, it is desired that the label at each sausage is arranged in the same position between the clipped sausage ends. In case the clipping is done with fixed machine parameters, the label position will, due to tolerances, drift on the clipped sausages. In case a specific position of the labels on the end product has to be ensured, this position or the position of an auxiliary marking arranged in fixed distances to the labels has to be monitored and, if necessary, be corrected.

Therefore a preferred embodiment of the double clipping apparatus comprises at least one sensor for sensing markings arranged on the casing and an analysing and control electronics for controlling the clip-distance in dependence on the output signals of the sensor.

Preferably, the sensor and the analysing and control electronics are designed in such way, that they enable a determination of the position of a marking arranged on the casing relative to a point that is, in longitudinal direction of the casing, fixed relative to the double clipping apparatus, for example fixed relative to a clip-channel or to a clip tool. By this, the position of the marking with respect to the clips for the readily clipped sausage can be calculated and, if necessary, be corrected through a selective change of the clip-distance.

In a further embodiment the sensor and the analysing and control electronics are designed in such way, that in a static state, e.g. in a state without relative movement between double clip apparatus and casing, which for gathering, voiding and clipping is common, they enable the determination of the position of a marking arranged on the casing relative to such a fixed point. This can be done through all thinkable combinations of sensors and markings, which are suitable to determine their relative position to each other in a static state, like e.g. simple geometric markings in combination with one-dimensional line scanners or two-dimensional picture patterns sensors or through markings which show a position coding that changes over their extent, e.g. in the form of colour and/or brightness graduations, in combination with one or several of sensors that are sensible to these codings, like e.g. colour brightness sensors.

It is also preferred that the double clipping apparatus is designed for the determination of the position of a marking arranged on the casing in the voided section between two clipped sausages relative to a point that is, in longitudinal direction of the casing, fixed relative to the double clipping apparatus. Especially in the case that the markings used for the determination of the position are auxiliary markings, which shall not appear on the ready product, this is of advantage.

Furthermore it is desirable that the double clipping apparatus is designed in such way, that it can use an external signal for the triggering of the clipping action. By this, there is the possibility to synchronise the cycle of the double clipping apparatus with the one of another machine, e.g. a sausage filling-machine that is superposed in the production process.

It is in particular advantageous if the double clipping apparatus is used for the manufacture of sausages with labels located in a defined position between the clipped ends from a pre-printed casing.

A final aspect of the invention is a method for forming clipped sausages comprising the steps of:

a) feeding a filled casing with pre-printed labels through a double clipping apparatus;

b) determining a location of said labels on said casing; and c) applying, in said double clipping apparatus, a pair of clips between two consecutive sausages for separating said consecutive sausages,
wherein a distance between said clips is adjusted depending on said location in order to maintain a pre-defined distance between said clips and said labels.

By continuously adjusting the clip distances in dependence on the determined actual location of said labels, a proper positioning of the labels on each of the sausages produced by this method can be achieved and can be maintained in an easy and reliable way.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE INVENTION

Figure 1:
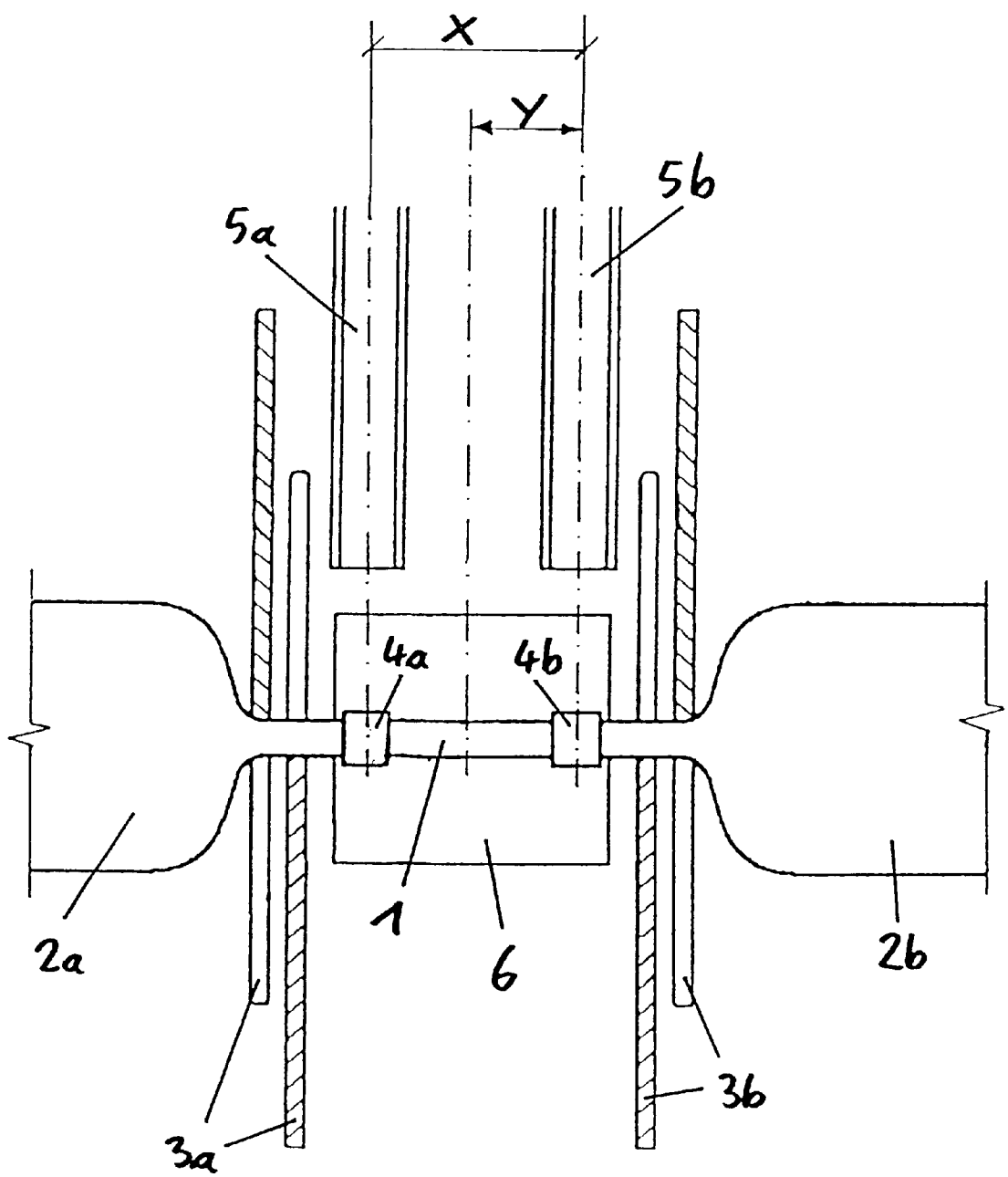
FIG. 1 is a partially sectional view of the essential elements of the double clipping apparatus.

The basic principle of a preferred embodiment of the invention is shown in FIG. 1. This view shows, beside the essential elements of the double clipping apparatus, the gathered and voided section 1 between two sausages 2a, 2b which has been created by gathering and voiding by means of the voiders 3a and 3b and that has been pinched off from the non-voided sections by installing clips 4a, 4b with a clip-distance of X, whereby the ends of the two sausages 2a, 2b have been formed. Such apparatus and the installing of the clips as such, e.g. by means of a die and a bottom die, which act on the, possibly preformed, clip-wire to form the clip, are known and will therefore not further be discussed. As can further be taken from the drawing, the clip-distance X results from the distance of the centers of the clip-channels 5a and 5b to each other at the time of clipping. As per the state of the art, this distance is chosen through an exchange of the respective clip-channels and/or related components. According to the invention, the clip channels 5a, 5b are now adjusted through a movement relative to each other, so that no exchange of parts is necessary for adjustment, whereby the clip-channel distance X can be adjusted through a shifting of the clip channel 5b, that lies next to the sausage filling-machine, by the adjustment measure Y in longitudinal direction of the gathered and voided section 1. The position of the clip channel 5a and therefore also the one of the clip 4a is fixed, but there are also embodiments imaginable at which the position of both clip channels 5a, 5b and therefore also of both clips 4a, 4b can be changed. In this embodiment, for both clip channels a common die (not shown) and a common bottom die 6 are used for all clip distances, but it is also possible to use for each clip channel a separate die and bottom die and to move them, if needed, together with the respective clip channel.

Figure 2:
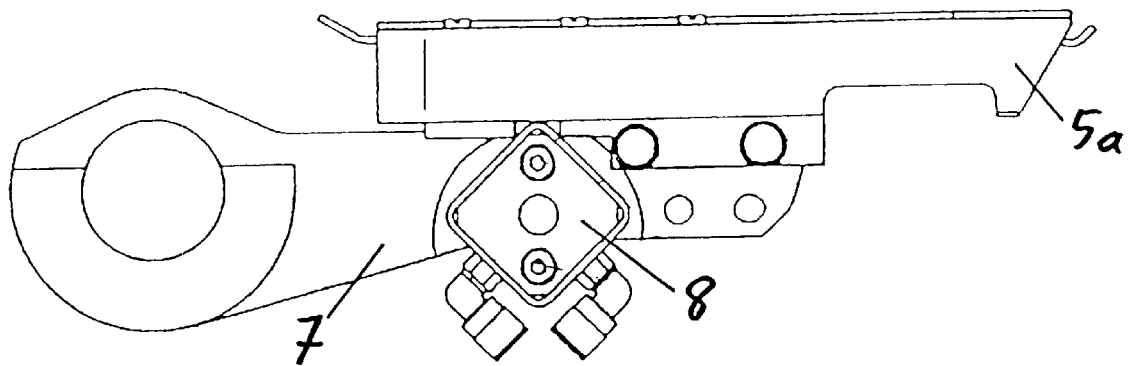
FIG. 2 is a side view of a variable adjuster apparatus for adjustment of the clip channel-distance of the double clipping apparatus.

In FIG. 2 a side view of an variable adjuster apparatus for the adjustment of the clip-channel distance of the double clipping apparatus is shown. As can be seen, the stationary clip-channel 5a is directly attached to a support arm 7, which also carries an arrangement of pneumatic actuating cylinders 8 for the adjustment of the clip-distance by displacement of the clip-channel 5b.

Figure 3:
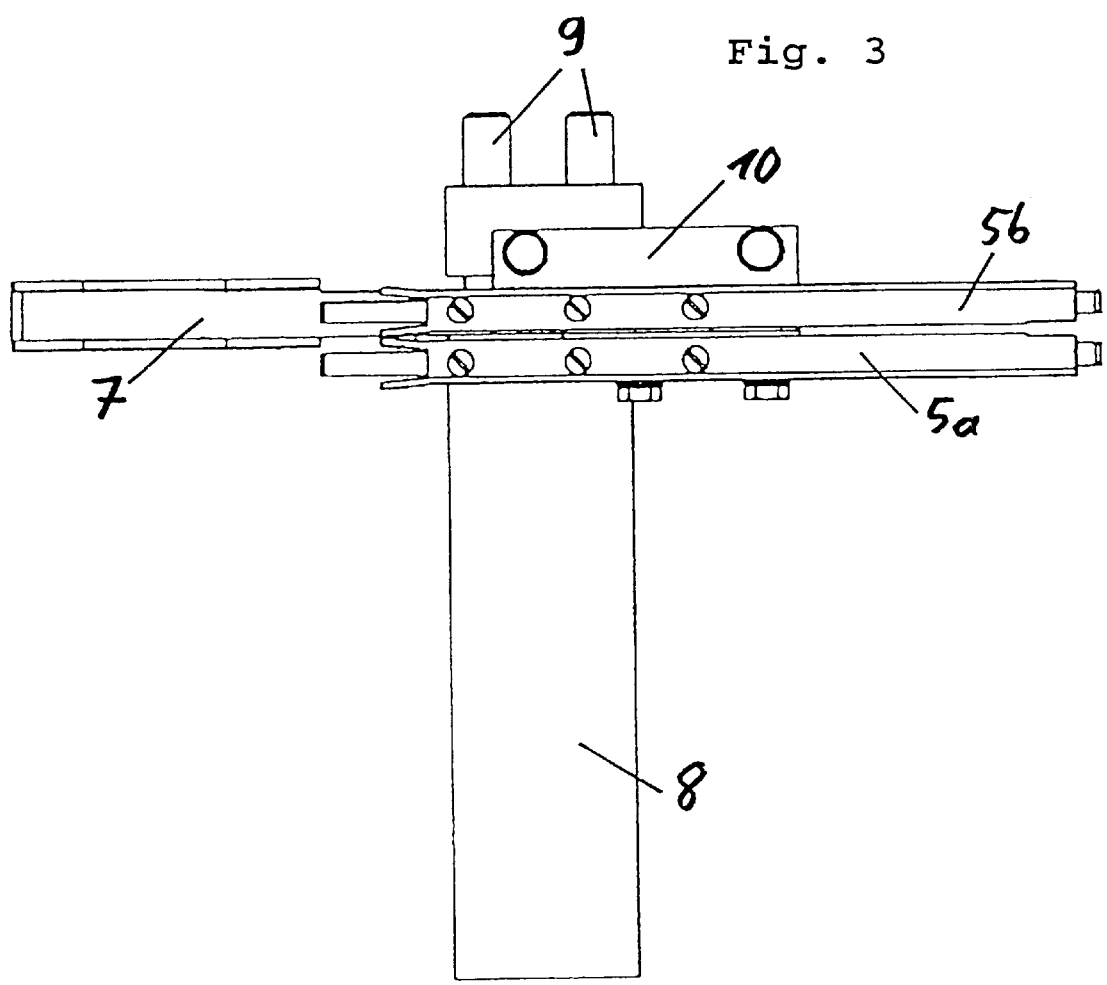
FIG. 3 is a top view on the apparatus of FIG. 2 at minimum clip-channel distance.
Figure 4:
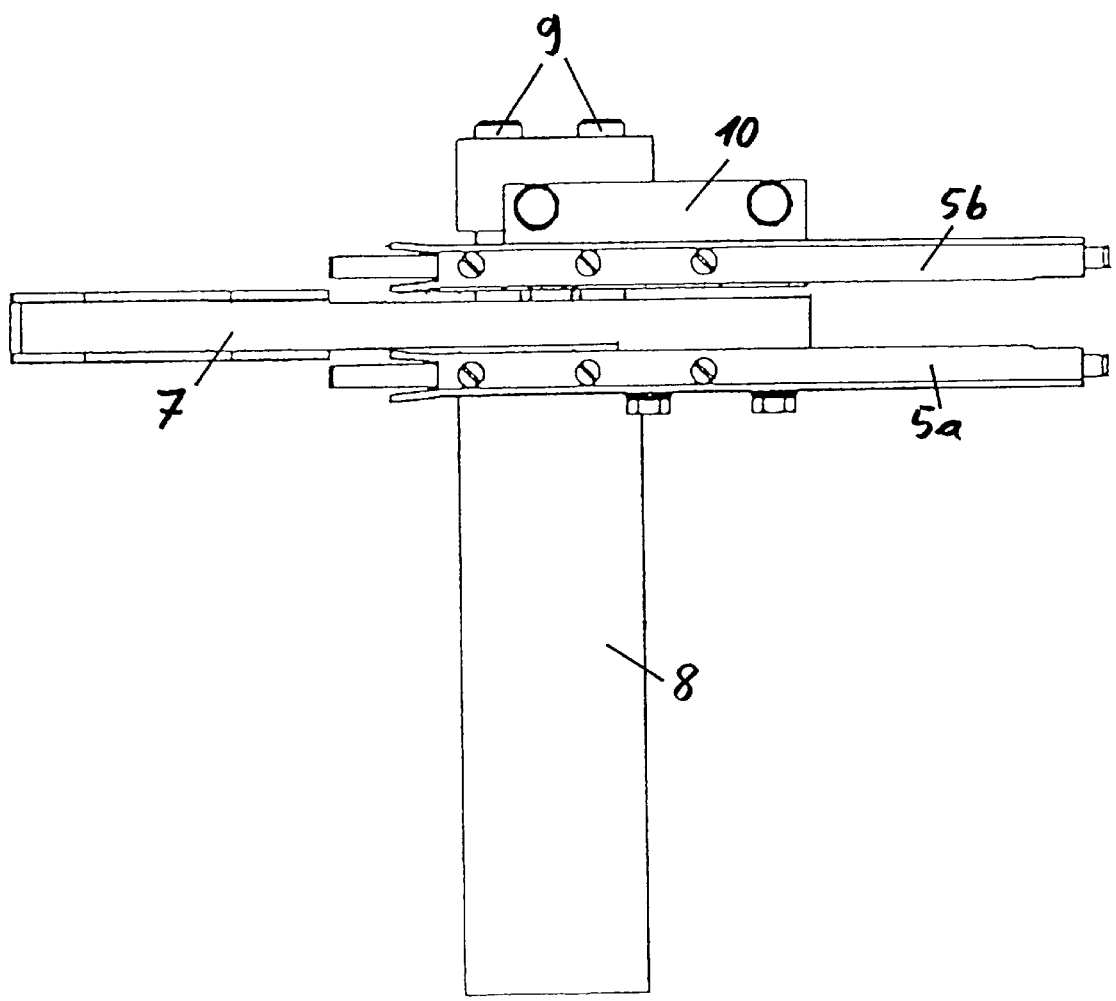
FIG. 4 is a top view on the apparatus of FIG. 2 at maximum clip-channel distance.

FIG. 3 shows a top view of the variable adjuster of FIG. 2 at minimum distance between the clip-channels 5a and 5b. As can be seen from this illustration, the displaceable clip-channel 5b is mounted to a skid 10 displaceable on guide rods 9 and is located at minimum clip-distance above the support arm 7. The guide rods 9 are fixed at the support arm 7. In case the distance between the clip-channels 5a and 5b shall be changed, a piston rod (not shown), which penetrates through the support arm 7 and is interconnected with the skid 10, is actuated by the arrangement of pneumatic actuating cylinders 8 and through this the skid 10 together with the clip-channel 5b, that is mounted on it, is displaced on the guide rods 9 by the respective amount relative to the clip-channel 5a that is mounted to the stationary support arm 7. A top view on this apparatus at maximum clip-channel distance is shown in FIG. 4. The preferred serial connection of pneumatic cylinders with preferably different stroke enables through selective control of the cylinders in both stroke directions a finely stepped movement of the adjustable clip-channel 5b in a cost-effective manner. Of course, it is possible to use any drive with steps or stepless drives for the movement of the clip-channel or the clip-channels.

The adjustment can, on the one hand, be done product-specifically. Packagings resp. sausages with large calibre normally need a longer sausage tag as such with small calibre in order to securely avoid a slipping of the clips. Also the way of further processing of the sausage (drying, fumigating, scalding, etc.) effects the optimum tag length. Since, as per the state of the art, the conversion of the clip-distance is difficult and time consuming, with the conventional double clipping machines it is often produced only at maximum clip-distance and independently of the product, what results in an unnecessary high casing consumption. On the clipping apparatus, according to the present invention, the clip-distance can be adapted to the necessary tag length in an easy way. Preferably, the clip-distance is included in the product-specific storable parameters of the clipping-machine or of the combination clipping-machine/filler so that for each product, for which parameters are stored, also the clip-distance is stored and can be adjusted by the machine control system upon invocation of this product. A further preferred usage is the precise positioning of a label printed on the packaging, which is described in the following.

Figure 5:
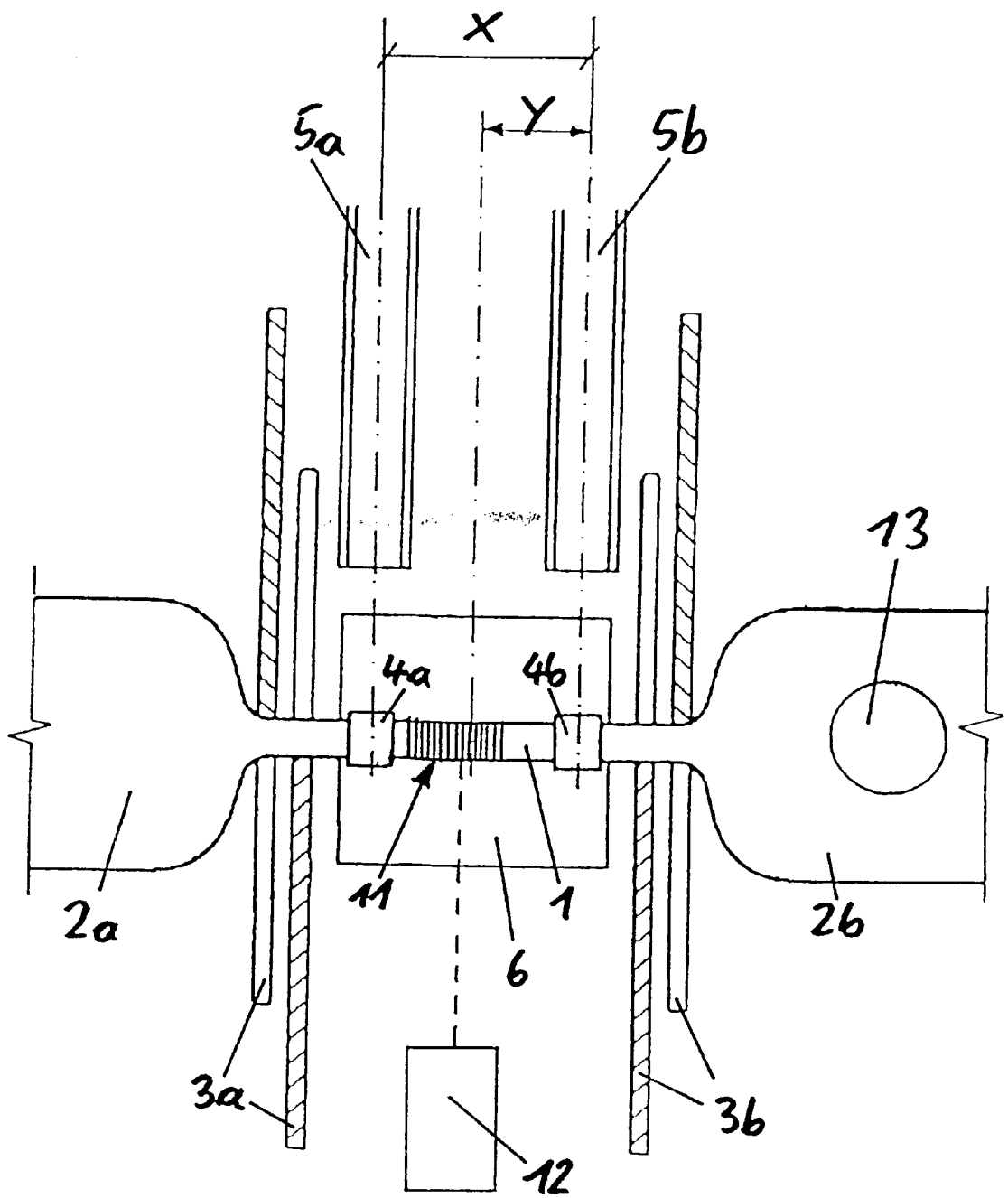
FIG. 5 is a partially sectional view of the essential elements of the double clipping apparatus with label-centering.

In FIG. 5 the basic principle of a preferred embodiment of the double clipping apparatus with label positioning is shown. The illustration equals the illustration of FIG. 1, but additionally comprises a marking 11 of the casing in the gathered and voided section 1 between the clips 4a and 4b as well as a sensor 12 fixedly mounted on the apparatus. In the illustrated situation the clips are already installed and for a short time, depending on the machine-cycle, no relative movement takes place between the filled casing and the double clipping apparatus resp. between the shown gathered and voided section and the shown portion of the double clipping apparatus. The marking 11 is e.g. printed on the casing and consists of a color-bar with a flowing transition from black to white extending in longitudinal direction. The sensor 12 is an optical sensor which is capable to determine in the present static state from the respective mixed color of the area of the marking 11 that is positioned opposite to him his exact position relative to the marking 11. Since the marking 11 has a known distance that is given by the printing on the casing to a following label 13 also printed on the the distance between the sensor 12 and label 13 is also known. Since moreover the positions of the clip-channels 5a and 5b relative to the sensor 12 are known, also the position of the label 13 relative to the clip channel 5b and relative to the clip 4b is known. In case the determined position of the marking 11 relative to the sensor 12 does not conform with a respective set value representing the target distance between the label 13 and clip 4b, a correction of the clip-distance X can be performed by displacing the clip-channel 5b. As has been mentioned earlier, in the case that has been discussed, the determination of the position of the marking 11, and therefore also the indirect determination of the position of the label, is done after clipping, so that eventually performed corrections of the clip-distance X result in a correction of the position of the label 13 in the following clipping-cycle. However, it is thinkable to perform the determination of the position after the gathering and voiding and before the clipping, by which at each case an actual check and, if necessary, an adjustment of the clip-distance X at each clipping-cycle would be possible. In the situation shown in FIG. 5 a maximum clip-distance exists, which permits a control action only in direction to a smaller clip-distance X. However, it is planned that the correction of the clip-distance X shall take place around a medium clip-distance in order to ensure an effective control action in both directions. Even though the determination of the label position in the above described example takes place in the static state, i.e. without relative movement between the filled casing and the double clipping apparatus and in the gathered and voided section between two sausages, there are also embodiments planned on which a determination of the position with the help of one or several sensors takes place outside of the gathered and voided section, in the static as well as in the dynamic state. In the static case, for example, the before described marking 11 can be arranged in an area on the sausage 2a, 2b, whereby it, however, would later be visible on the ready sausage. To avoid this disturbing effect, in this case it is also imaginable to use markings that are, without any additional means, invisible for the human eye, but are readable for an appropriate sensor, like e.g. fluorescence markings. If the label itself shall be used as marking, the position of the same can be determined in static or dynamic state with a line camera or a dot-matrix camera with appropriate analyzing software. In the dynamic case it is also possible to determine with the sensor the moment in the clipping-cycle of the double clipping apparatus, at which the label arranged on the filled casing passes a specific position of the double clipping apparatus. By this, it can be determined if the label hurries ahead or if it lags. An appropriate correction via the clip-distance can then be initiated. As reference signal for the clipping-cycle preferably a signal received from a filling-machine that is, in the production process, directly superposed, is used for triggering the clipping action so that the time difference between the sensor signal and the clip signal from the filling-machine forms the characteristic parameter for the label position and a deviation of the same from a set-value triggers a correction of the clip-distance. The usage of the double clipping apparatus, as per the invention, for clipping with clipping signal from the filling-machine and adaptation of the clip-distance yields in a simple way correctly tautly stiffed sausages with correct weight and correctly located label. This in contrast to known solutions, at which the clipping command is triggered by the marking or the label itself (DE 36 08 983 and DE 195 19 394).

While there are shown and described presently preferred embodiments of the invention, it is to be distinctly understood that the invention is not limited thereto but may be otherwise variously embodied and practiced within the scope of he following claims.

What is claimed is:

1. A double clipping apparatus for forming sausages from a filled sausage type packaging or from a filled casing by forming gathered and voided sections between separate, adjacent sausages having a void section therebetween and installing in each section two clips at an adjustable distance from each other, comprising a variable adjuster mechanism for adjusting the distance between the clips attached in said section.

2. The double clipping apparatus of claim 1 further comprising:
   a) two clip-channels for supplying said clips to said section; and
   b) a movement means being part of said variable adjuster for moving at least one of said clip-channels relative to the other clip-channel and thereby changing said distance.

3. The double clipping apparatus of claim 1 wherein said distance is adjustable during operation of said double clipping apparatus.

4. The double clipping apparatus of claim 1 wherein said distance is adjustable in stepless manner.

5. The double clipping apparatus of claim 1 wherein said distance is adjustable in steps.

6. The double clipping apparatus of claim 1 wherein said distance is manually adjustable.

7. The double clipping apparatus of claim 1 wherein said distance is automatically adjustable in dependence on one or several production-parameters.

8. The double clipping apparatus of claim 2 wherein said movement-means further comprises an arrangement of actuating-cylinders for adjusting said distance in steps.

9. The double clipping apparatus of claim 8 wherein said actuating-cylinders are pneumatic cylinders.

10. The double clipping apparatus of claim 1 further comprising:
    a) at least one sensor for sensing markings on said sausage type packaging or said casing; and
    b) analyzing and control electronics for controlling said distance in dependence on output signals of said sensor.

11. The double clipping apparatus of claim 10 wherein said sensor and said analyzing and control electronics are adapted for determining a position of a marking, which is arranged on said sausage type packaging or said casing, relative to a point, that, in longitudinal direction of said sausage type packaging or said casing, is fixed relative to said apparatus.

12. The double clipping apparatus of claim 11 wherein said sensor and said analyzing and control electronics are adapted for determining the position of said marking in a static state.

13. The double clipping apparatus of claim 12 wherein said sensor and said analyzing and control electronics are adapted for determining the position of a marking extending in longitudinal direction on said sausage type packaging or said casing and having a position coding that changes in said longitudinal direction.

14. The double clipping apparatus of claim 10 wherein said sensor is an optical sensor.

15. The double clipping apparatus of claim 14 wherein said sensor is capable of discriminating different colors and/or brightnesses of colors.

16. The double clipping apparatus of claim 10 wherein said sensor and said analyzing and control electronics are adapted for determining the position of a marking in said gathered and voided section before or after installation of said clips in said section.

17. The double clipping apparatus of claim 1 wherein it is adapted for triggering a clipping action based on a signal received from an external apparatus.

18. The double clipping apparatus of claim 17 wherein said signal is a signal received from a sausage filling-machine which is superposed in the production process.

19. A double clipping apparatus for forming sausages from filled tubular packagings or filled casings by forming gathered and voided sections and installing in each section at a time two clips at a distance from each other, wherein said distance is manually or automatically adjustable during operation of said apparatus.

20. A double clipping apparatus for forming sausages with clipped ends from a filled casing by gathering and voiding sections of said casing and installing in each section at a time two clips at a distance from each other that each form the end of a different sausage, wherein said distance is adjustable, without an exchange of components, by means of a variable adjuster defining said distance.

21. The double clipping apparatus of claim 20 further comprising:
    a) two clip-channels for supplying said clips to said section being arranged side by side thereby defining said distance;
    b) a movement means for moving at least one of said clip-channels relative to the other in order to change said distance;
    c) at least one sensor for sensing markings or labels on said casing; and
    d) an analyzing and control electronics for automatically adjusting said distance in dependence on signals received from said sensor during operation of said apparatus.

22. The double clipping apparatus of claim 21 wherein said sensor and said analyzing and control electronics are adapted for determining, in the static or in the dynamic state, the position of said markings or labels relative to a point of said apparatus, that is, in longitudinal direction of said casing, fixed relative to said apparatus.

23. The double clipping apparatus of claim 22 wherein said sensor is an optical sensor that is capable of discriminating different colors and/or brightnesses of colors and said sensor and said analyzing and control electronics are adapted for determining, in the static state, the position of markings or labels extending in longitudinal direction on said casing and having a position coding that changes in said longitudinal direction.

24. The double clipping apparatus of claim 23 wherein said apparatus is adapted for triggering a clipping action based on a signal received from a superposed sausage filling machine and said sensor and said analyzing and control electronics are adapted for determining the position of markings or labels in said gathered and voided section before or after installation of said clips.

25. A method for forming clipped sausages comprising the steps of:
    a) feeding a filled casing with pre-printed labels through a double clipping apparatus;
    b) determining a location of said labels on said casing; and
    c) applying, in said double clipping apparatus, a pair of clips between two consecutive sausages for separating said consecutive sausages,
       wherein a distance between said clips is adjusted depending on said location in order to maintain a pre-defined distance between said clips and said labels.

26. The method of claim 25 further comprising the step of stopping said casing for applying said clips and for determining said location.

27. The method of claim 25 wherein determining said location and adjusting said distance is automatically performed by means of at least one sensor and a control system.

28. The method of claim 27 wherein a signal for triggering a clipping action is received from a filling machine which is, in the production process, superposed to said double clipping apparatus.

29. The method of claim 25 wherein said distance is adjusted during operation of said double clipping apparatus.

30. The method of claim 25 wherein said distance is adjusted in order to locate at a time one of said labels in the center of each of said sausages.

31. A double clipping apparatus comprising, in combination:

first and second voider and gathering plates for gathering and voiding a section of filled casing;

first and second clip attachment means for attaching first and second clips to a said section; and means for adjusting the separation of the clip attachment means for attachment of clips to said section.

* * * * *